United States Patent
Dise

(10) Patent No.: US 6,761,520 B1
(45) Date of Patent: Jul. 13, 2004

(54) CLINCH-TYPE BLIND NUT

(75) Inventor: Ronald S. Dise, Perkasie, PA (US)

(73) Assignee: PEM Management, Inc., Wilmington, DE (US)

( * ) Notice: Subject to any disclaimer, the term of this patent is extended or adjusted under 35 U.S.C. 154(b) by 0 days.

(21) Appl. No.: 10/434,196

(22) Filed: May 9, 2003

(51) Int. Cl.$^7$ .............................. F16B 13/04; F16B 37/04
(52) U.S. Cl. .............................. 411/38; 411/55; 411/113; 411/183
(58) Field of Search ............................ 411/34, 36, 37, 411/38, 55, 113, 183, 180, 181

(56) References Cited

U.S. PATENT DOCUMENTS

| | | |
|---|---|---|
| 2,255,650 A | 9/1941 | Burke |
| 2,324,142 A | 7/1943 | Eklund |
| 3,136,203 A | 6/1964 | Davis |
| 3,174,387 A | 3/1965 | Fischer |
| 3,215,026 A | 11/1965 | Davis |
| 3,236,143 A | 2/1966 | Wing |
| 3,322,449 A | 5/1967 | Becker |
| 3,369,442 A | 2/1968 | Darby et al. |
| 3,657,955 A * | 4/1972 | McKay ........................ 411/38 |
| 3,948,142 A * | 4/1976 | McKay et al. ................ 411/38 |
| 4,312,613 A | 1/1982 | Binns |
| 4,439,078 A * | 3/1984 | Dessouroux ............. 411/38 X |
| 4,712,958 A | 12/1987 | Sparling et al. |
| 4,826,372 A | 5/1989 | Kendall |
| 4,999,896 A | 3/1991 | Mangus et al. |
| 5,248,231 A | 9/1993 | Denham et al. |
| 5,332,349 A | 7/1994 | Gerwin |
| 5,680,690 A | 10/1997 | Briles et al. |
| 5,846,039 A | 12/1998 | Kirchen et al. |
| 5,893,684 A | 4/1999 | Skaggs |
| 6,042,313 A | 3/2000 | Dehlke |
| 6,045,309 A | 4/2000 | LeVey |
| 6,254,325 B1 * | 7/2001 | Kun ............................ 411/38 |

* cited by examiner

Primary Examiner—Neill Wilson
(74) Attorney, Agent, or Firm—Gregory J. Gore

(57) ABSTRACT

A threaded blind insert includes a shank with an axial bore therethrough having a head at one end and a threaded region of the bore at the opposite end. The wall of the shank between its outer surface and the bore includes a weakened deformable portion created by a reduced outside diameter of the shank in that area. A reinforcement collar integral with the shank is located at approximately the middle of the deformable portion of the shank thus providing a more rigid area at the collar which creates bulges in the deformable portion on either side of the collar when the insert is compressed. A flange located adjacent the underside of the head of the insert has an outer diameter greater than the shank but less than the head. When fitted into a mounting hole of a workpiece, the flange centers the insert and provides an annular gap between the shank and the mounting hole. As the insert is compressed by an installation tool, the bulges provide a reactive force against the backside of the workpiece which clamps the workpiece between the bulges and the head of the insert. Reaction forces of the bulges are sufficient to embed the head into the panel completely so that the installation provides a flush attachment. Alternately, the reinforcement collar may be replaced by a band of greater hardness on the deformable wall which can be created by heat treatment.

13 Claims, 3 Drawing Sheets

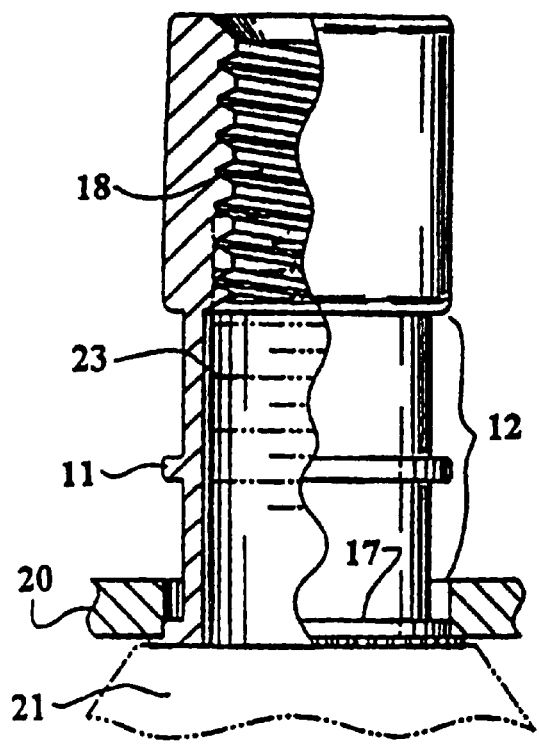
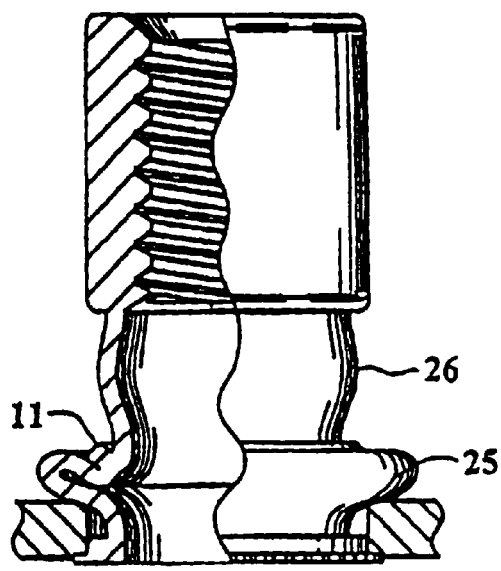
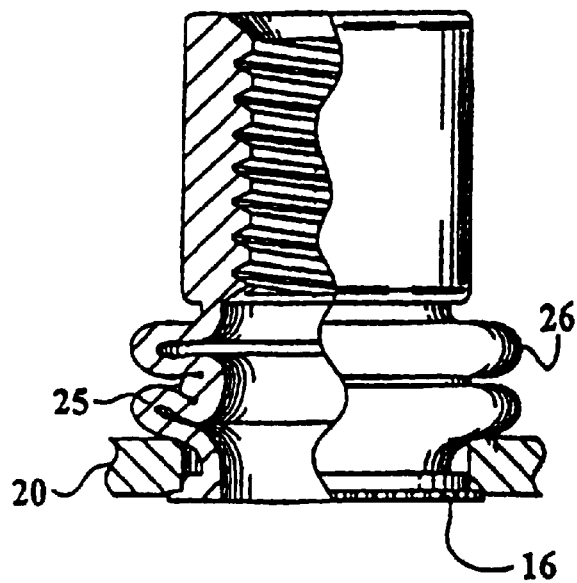
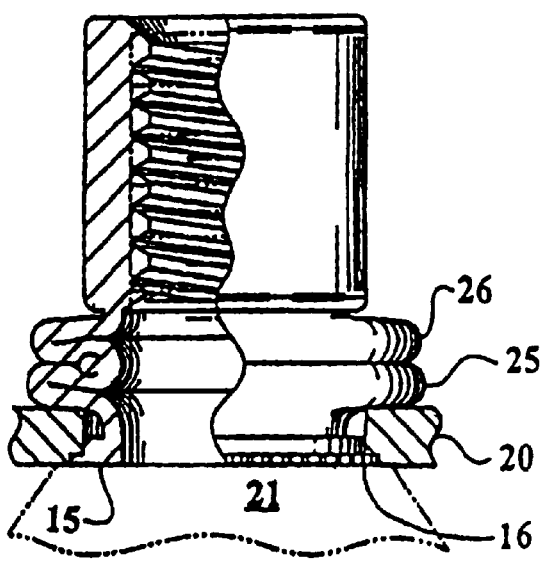

CLINCH-TYPE BLIND NUT

FIELD OF THE INVENTION

The present invention relates to inserts of the blind nut type which are permanently installed in a panel with access to the panel from one side only. More specifically, it applies to a blind nut which provides flush clinch-type attachment by receiving the cold flow of metal from the panel.

BACKGROUND OF THE INVENTION

Blind nuts are a class of inserts well known in the insert industry which provide a threaded element to a thin panel such as a sheet of metal which is of insufficient depth and/or hardness to support threads directly in the sheet. This type of a nut is called "blind" because it can be applied in situations where there is access to only one side of the panel. Typically the nut is gripped to the panel between a flanged head which lies against one side of the panel and collapsed bulges or bulbs which abut the opposite side of the panel. The bulbs are created by deforming an intermediate tubular portion of the nut shank of reduced diameter (hereinafter "deformable portion") adjacent to an internally threaded end by a compression tool mandrel threaded into the nut. After the nut is installed, the mandrel is unthreaded from the nut leaving the nut/panel assembly ready to receive a threaded screw or bolt for attachment of other parts to the panel. There are also externally threaded blind inserts in which a permanently attached stud replaces the function of the mandrel as the means for applying the compression load to the end of the insert.

The performance of a blind nut/panel assembly may be described by two distinct axial strength considerations of attaching a mating threaded insert. The first is the clamp load capacity, which is a measure of the amount of axial load that can be applied when the mating threaded fastener is tightened. Clamp load capacity is a function of the thread-stripping strength and the support strength of the threaded area. Considering the shape of the cross section of the installed insert, this support strength is a combination of the bulb shear strength and the compressive strength of the deformable portion within the panel. The second strength consideration is the working load capacity which is a measure of the load required to separate the attached part from the panel containing the blind insert. Considering the shape of the cross section of the installed insert, the bulb is the only element preventing the insert from pulling out of the panel and hence the working load capacity is simply the bulb shear strength. Because the additive effect of the deformable portion compressive strength is not present for the working load, the working load capacity will always be less than the clamp load capacity.

Another consideration is the type of installation tool that may be used. Tools to install blind nuts are of two basic types: spin-pull tools and spin-spin tools. Spin-spin tools create compressive load in the collapsible region of the insert by rotation of a mating threaded member. Spin-spin tools are inexpensive, light-weight and simple to set up and use and are therefore generally preferred. Because the upset force they can develop is limited, they generally cannot be used to install parts with thicker walls. Spin-pull tools spin the mating threaded member into position and then apply an axial pulling force before spinning in the opposite direction to remove the threaded member from the nut. Spin-pull tools are more complex and consequently more expensive and heavier than spin-spin tools. They are also more difficult to set up and require more maintenance. The upset load or the force required to form the panel gripping bulb therefore often determines which of these two common types of installation tools can be used. It is therefore desirable to provide a blind nut insert with the greatest working load capacity and with an upset load that can be achieved by the limited upset force provided by a spin-spin type installation tool.

A desired performance characteristic of blind nuts is a large grip range. That is, the ability for the same part to attach to panels of various thickness. Hereinafter, the term "grip" will be used to mean the portion of the shank deformable portion that lies within the panel hole between the primary bulb and the insert head.

In certain applications, there is a need for a blind nut which can be installed flush with the access side of the panel. This may require countersinking the panel to receive the head of the nut so that the face of the head is flush with the front of the panel, however this is undesirable since countersinking the panel requires an additional manufacturing operation. To overcome this problem, a broaching-type blind nut has been devised which provides flush attachment in which the nut does not have a head but instead has a serrated end portion with teeth that secure the blind nut to the workpiece in a non-rotating relationship without the need for a countersink in the panel. Such an insert is disclosed for example in U.S. Pat. No. 3,948,142 issued to McKay et al. In order to accommodate the broaching attachment, a cavity in the interior of the nut receives the inward collapsing deformable wall of material into the body of the nut. One of the problems with this type of attachment, however, is that there is no positive structure on the insert to prevent the insert from pushing out of the sheet. A push-out load equal to the broaching load will cause it to broach all the way through the panel and become dislodged.

It is also known in the art to utilize a self-clinching type attachment for flush-mounted blind nuts. A self-clinching type blind nut is shown, for example, in U.S. Pat. No. 3,215,026 issued to Davis. Clinch-type attachment requires a much higher installation clamp load than broaching attachment since it depends on the cold flow of the deformed metal panel. Therefore, within the range of the shear strength of the known blind nut materials and construction, this insert is limited to metal panels of relatively soft material. Attempts to increase shear strength of the nut by increasing the strength of the nut material works against the nut's ability to properly collapse against the backside of the attached sheet given the limited working force of installation tools. Also, attempts to structurally increase the strength of the clamp load of the blind nut without increasing the material strength are shown, for example, in U.S. Pat. No. 2,324,142 issued to Eklund in which the collapsible section of a blind rivet is provided with a second reinforcing bulb. However, as disclosed, this structure requires applying pairs of grooves to the outer surface of the collapsible portion of the nut shank which does not provide the necessary bulb shear strength for the higher working loads required by clinch-type attachment into harder metal sheets.

It is further known to create an area of weakness in the region of a blind nut deformable portion by annealing to create a zone of reduced hardness along the length of the deformable portion. When the insert is compressed, a bulb forms in the annealed area. This method of altering a blind nut metallurgy for bulb production is shown, for example, in U.S. Pat. No. 4,826,372 issued to Kendall.

Despite the efforts in the art, a blind nut which can be installed flush with the access side of the panel and which displays a wide grip range that can be installed by a spin-spin tool has not yet been achieved. There is therefore a need in the art to provide a blind nut with a clinch-type flush attachment capable of use in sheets of harder metal. There is a further need to provide a clinch-type blind nut for harder metal panels which can be installed with a spin-spin type tool and which provides a wide grip range for installation into panels of varying thickness.

SUMMARY OF THE INVENTION

To meet the needs in the art described above, the present blind nut has been devised. It provides a blind nut with a relatively thin wall and an increased deformable shank length with multiple bulb producing capability. The bulbs may be formed by providing the inside or outside surface of the insert with additional material in the area of the deformable portion of the shank. Alternatively, selectively hardened collars may be formed in the material in the deformable region by heat treatment such as selective annealing.

Because the wall thickness is relatively thin, the present insert can be installed with a spin-spin tool and provides a wide grip range. When the present insert is installed, two bulbs will form. By design, the primary bulb in contact with the sheet will always be the same or larger in diameter than the secondary supporting bulb that forms adjacent to the threaded end region. Because two bulbs are formed, the bulb shear strength will be proportional to four times the wall thickness rather than being proportional to two times the wall thickness when only one bulb is formed.

By controlling the axial position of the multiple bulb producing feature of the invention, the order in which the multiple bulbs form can be controlled. In most designs, the bulb adjacent the panel will be formed first. In one embodiment, the compressive strength of the part inside the panel mounting hole is reduced by increasing the clearance between the outside diameter and the mounting hole. This clearance results in bending of this area when the bulb forms adjacent to the panel. The presence of this initial bending facilitates additional bending as the head is embedded.

In another embodiment, the multiple bulb producing capability of the insert can be provided by changing the metallurgical properties of selected localized areas of the insert by either selective hardening or selective annealing. Alternatively, a reinforcing rib may be added to the outside diameter of the part to create a localized area of increased strength, on either side of which bulbs are formed as will be further described herein.

More specifically, the invention comprises a threaded blind insert having a shank with an axial bore therethrough having a head at one end and a threaded region of the bore at the opposite end, the shank having a wall line between an outer surface thereof and the bore. A deformable portion of the shank is created by an area of reduced diameter located axially along the outer surface of the shank A reinforcement collar integral with the shank is located at approximately the middle of the area of reduced diameter and provides a greater wall thickness at that point to create bulges on either side of the collar as the insert is compressed when it is clamped to a panel. The insert further includes a flange located adjacent the underside of the head. The flange has an outer diameter greater than the diameter of the shank but less than the diameter of the head. The head includes a knurl or other non-round feature such as a polygonal shape. The insert attaches to a panel having a circular aperture with a diameter slightly less than the diameter of the flange which is fitted within the aperture. By these dimensions, a substantial annular gap is provided which lies between the shank and the sidewall of the aperture. As the insert is compressed, bulges form on either side of the collar and provide a reactive force against a backside of the panel which clamp the panel between the bulges and the head of the insert. The reaction forces of the bulges is sufficient to embed the head and the knurl into the panel such that the final installation provides a flush attachment with the front surface of the panel. Alternatively, the reinforcement collar can be replaced by a band of greater hardness of the deformable wall which is created by heat treating the insert. This can be achieved by annealing portions of the deformable portion on either side of the band or heat treating the area of the band to create an area of greater hardness or annealing the material on opposite sides of the band to soften the material in those regions.

Thus, the present invention provides the following advantages. First, it provides increased bulge strength relative to wall thickness and upset load. Secondly, it allows a flush installation on the side from which the insert is installed without special hole preparation. Thirdly, as further explained herein, it provides increased torsional holding strength in a round mounting hole. And finally, the invention provides increased grip range compared to blind inserts using heavier wall thickness to increase bulb shear strength. Other objects and advantages will be apparent to those of skill in the art from the following drawings and detailed description of the preferred embodiment.

BRIEF DESCRIPTION OF THE DRAWINGS

FIGS. 3–6 are a series of partial cut-away side sectional views depicting the sequence of insert installation according to the invention.

DESCRIPTION OF THE PREFERRED EMBODIMENT

Figure 1:
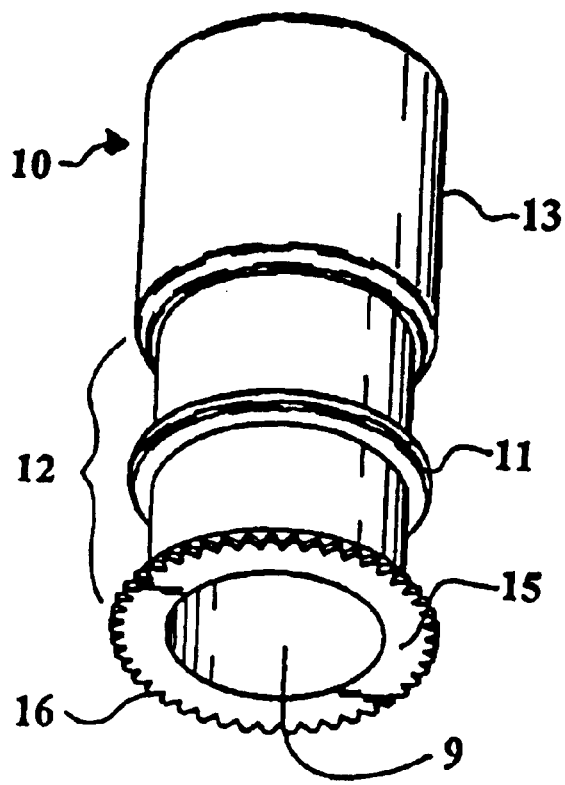
FIG. 1 is a bottom front isometric view.
Figure 2:
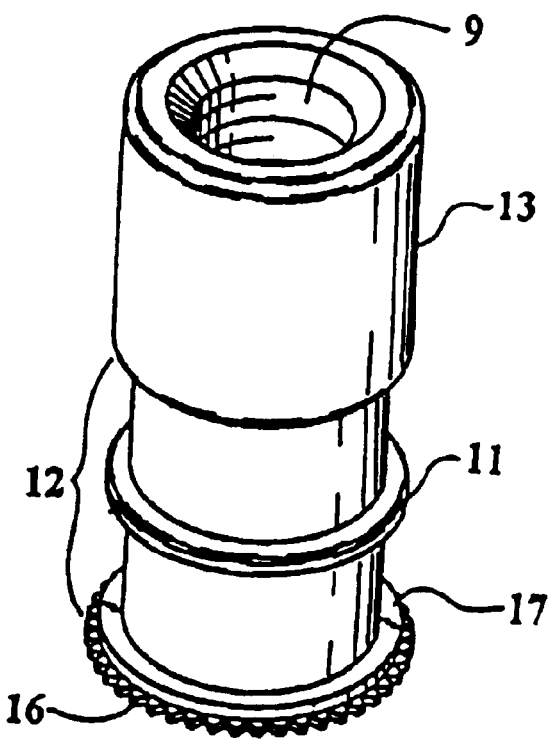
FIG. 2 is a top front isometric view.

Referring now to FIGS. 1 and 2, the first embodiment of the insert 10 of the invention includes an axial bore 9 therethrough. An integral radial collar 11 lies along the shank in approximately the center of deformable area 12, which is an area of reduced outer diameter compared to the flange 17. The collar 11 is located slightly closer to the threaded portion 13 of the insert than to the head 15. The head 15 includes a knurl 16 that is commonly used on certain types of self-clinching inserts which is known to provide a high level of torsional resistance when pressed into a workpiece. The knurl is hardened so that it is greater than the hardness of the workpiece. Flange 17 on the underside of head 15 centers the insert in a mounting hole of the workpiece and provides an annular gap between the shank and the sidewall of the hole. The axial length of the flange must be somewhat less than the minimum panel thickness into which the insert can be installed.

FIGS. 3–6 depict an installation sequence which shows the buckling of the wall of the insert in the deformable area and the embedding of the knurl portion of the head. Referring first to FIG. 3, the embodiment of FIG. 1 is shown assembled onto an installation tool 21 which is shown in phantom. The tool includes a threaded mandrel 23 which extends into the insert. The tool further includes a nosepiece 21 with an endface that abuts the head of the insert at all times during installation. As shown in this figure, the flange 17 adjacent the head of the insert is set into the mounting hole of the workpiece or panel 20 to properly center the insert in the hole. Reinforcement collar 11 lies approximately in the center of shank deformable portion 12. The installation process begins with the installation tool applying a pulling force to the mandrel which is engaged with the threads 18 of the insert.

Referring now to FIG. 4, the pulling force of the tool loads the deformable portion of the insert in compression. In this figure, a first bulb 25 directly adjacent the backside of the panel has been completely formed and a second bulb 26 is beginning to form. For a deformable portion of uniform wall thickness divided into two segments by a collar 11 of external material along its outside diameter, the longer segment will have a lower compressive strength and will be the area to buckle first. In this manner, the order in which the bulbs form can be controlled by the axial placement of the collar of material. At this point in the process, the first bulb 25 is not yet symmetric about the radial axis.

Referring now to FIG. 5, the installation tool continues the pulling force and a second bulb 26 is almost completely formed. The deformable portion between the flange and the backside of the panel has now assumed a generally radial shape. At this point in the process, the knurled head 16 has not yet started to embed into the panel 20.

Referring now to FIG. 6, the final stage of the installation of this embodiment is depicted. The increasing force applied by the tool 21 has now caused both bulbs 25 and 26 to fully close, that is, the two surfaces which were formerly located on the inside diameter of the deformable portion have moved axially to a point of intimate contact with each other. After each bulb has closed on itself and the two bulbs have closed against each other, the bulbs suddenly develop significant resistance to further deformation. As the tool applies increasing force, the reaction force of the tool nosepiece against the head of the fastener exceeds the force required to embed the knurl head into the workpiece, plus the force required to deform the shank within the grip by an amount equal to the head thickness. Therefore, the head embeds fully and the deformable portion of the shank within the grip deforms resulting in a tighter radius of curvature of the shank against the backside of the panel than as shown in FIG. 5. Sufficient clearance between the outside diameter of the shank and the panel hole is necessary for this to occur. This clearance is provided by the difference in diameters between the shank and the flange which provides an annular gap that lies between a sidewall of the hole and the shank. The tool which has a nosepiece of larger diameter than the knurled head 15 serves as a positive stop preventing the head from embedding farther than flush with the front surface of the panel.

Both bulbs are now essentially symmetric about a radial plane and are fully formed. The knurling 16 has fully embedded into the panel 20 and the installation process is complete. Formation of the bulbs as above describe a critical feature of the invention which permits an insert soft enough to be deformable yet provides sufficient resistance to cause the knurl to fully embed into the panel. Although the preferred embodiment utilizes knurling to provide torsional securement means, other means such as a non-circular head shape or radial protrusions may also be employed.

Figure 7:
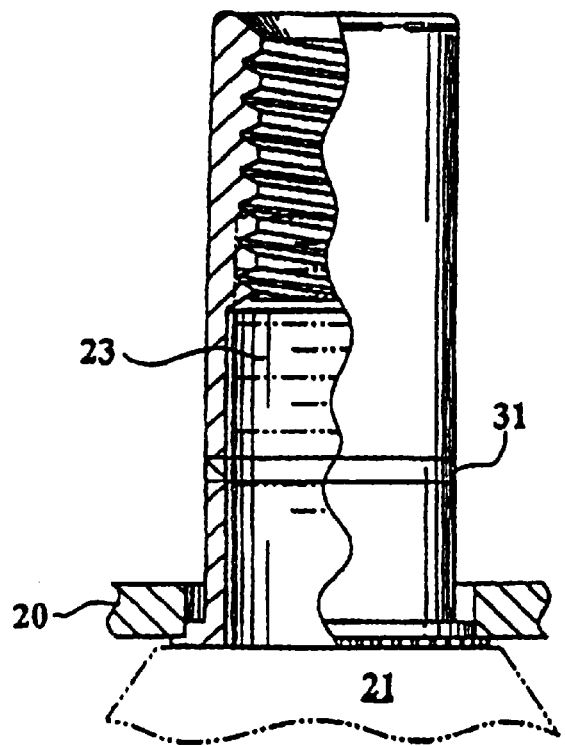
FIGS. 7–10 are a series of partial cut-away side sectional views depicting the sequence of insert installation according to an alternate embodiment of the invention.

FIGS. 7–11 depict an alternate embodiment of the invention. In this embodiment, multiple bulb formation is not aided by a collar of extra material along the outside diameter of the shank as in the previous embodiment but rather by a band of greater hardness of the shank material. The band of greater hardness 31 may be created by selectively hardening the area of the band or by hardening the entire insert and then selectively annealing the remainder of the shank around the area of the band to reduce its hardness. Otherwise, this embodiment is similar in other physical respects to the previous embodiment shown in FIGS. 1–6 except that the area of reduced outer diameter compared to the flange extends the full length of the shank. The thinner walled area of the shank which provides the deformable portion lies between the flange and the threaded region being achieved by the difference in internal diameters of the deformable region and the threaded region. The sequence of deformation is similar to the embodiment shown in FIGS. 1–6. As shown in FIG. 7, the first step in the installation process is to thread the insert onto the mandrel 23 of the tool until the head of the insert abuts the tool nosepiece 21 and then to place the flange of the insert into the hole in the panel 20.

Figure 8:
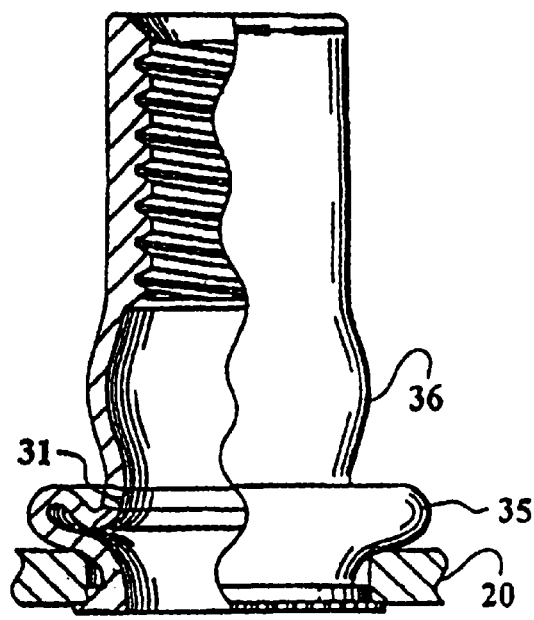

Referring now to FIG. 8, the installation tool applies increasing pulling force to the insert, thus compression loading the wall in the area of reduced diameter. In this embodiment, as in the previous embodiment, the first bulb 35 closer to the panel 20 forms first and at this point the second bulb 36 is beginning to form. And likewise, placement of the relatively harder band of material 31 along the length of the deformable portion determines on which side of the band 31 the bulb is formed first.

Figure 9:
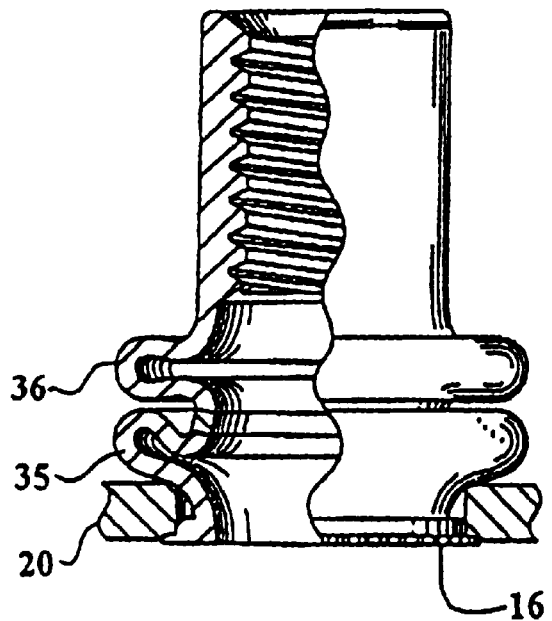

Referring now to FIG. 9, the second bulb 36 created in the formation process of the second embodiment is now almost completely formed. Configuration of the portion of the shank wall in the area of reduced diameter located between the centering flange and the backside of the panel 20 has assumed a generally radial shape. At this point it will be noted that the knurled head 16 has not yet started to embed into the panel 20.

Figure 10:
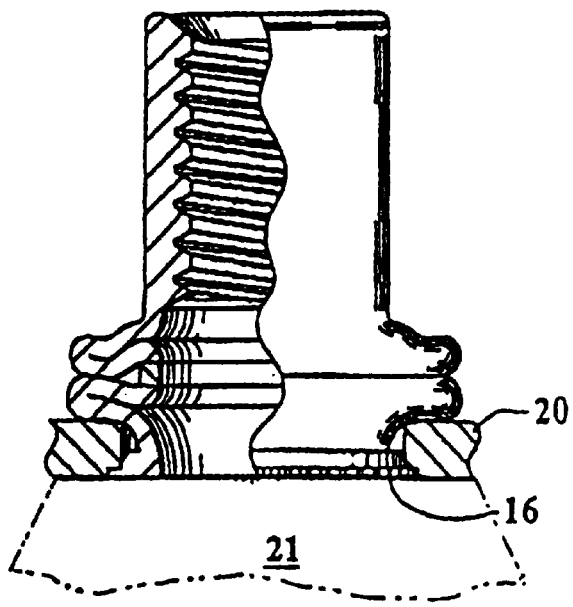

FIG. 10 depicts the final step in the installation process. When increased pulling force of the installation tool has caused both bulbs to fully form and the knurled head 16 to fully embed into the panel 20, ever increasing force applied by the tool has caused both bulbs to fully close and become substantially symmetric about a radial plane. As in the previous embodiment, the wall of the insert within the panel hole deforms resulting in a tighter radius against the backside of the panel 20 than is depicted in FIG. 9. This is achieved in part by the spacing between the panel hole diameter and the outside diameter of the shank provided by the flange. As in the previous embodiment, the nosepiece 21 of the tool provides flush attachment with the knurled head 16 into the front side of the panel 20.

From the foregoing description of the preferred embodiment, it will be understood that the object of the invention has been achieved. The blind insert of the invention provides a controlled sequential deformation of the fastener that allows for flush attachment of a knurled head into relatively hard workpieces or panels. It should be understood that there may be other modifications and changes to the present invention that will be obvious to those of skill in the art from the foregoing description, however, the present invention should be limited only by the following claims and their legal equivalents.

What is claimed is:

1. A threaded blind insert, comprising:
   a shank having an axial bore therethrough with a head at one end and a threaded region of the bore at an opposite end, said shank having a wall lying between an outer surface thereof and said bore;

a deformable portion of said shank being an area of reduced diameter located axially along said outer surface of said shank; and a reinforcement collar integral with said shank and extending radially therefrom, said collar being axially located substantially in the middle of said deformable portion wherein the thickness of said wall in the area of said deformable portion is less than other areas of said wall except in the area of said collar where it is substantially greater.

2. The insert of claim 1 further including a flange located adjacent an underside of said head, said flange having an outer diameter greater than the diameter of said shank but less than the diameter of said head.

3. The insert of claim 2 wherein the head has an outer periphery which includes torsional securement means.

4. The insert of claim 3 wherein said torsional securement means is a knurl.

5. An assembly of parts comprising:

a shank having an axial bore therethrough with the head at one end and a threaded region of the bore at an opposite end;

a flange located adjacent an underside of said head, said flange having an outer diameter greater than the diameter of said shank directly adjacent said flange but less than the diameter of said head, said head further including a knurl around its periphery;

a panel having a circular aperture with a diameter slightly less than the diameter of said flange, said flange fitted within said aperture such that a substantial annular gap lies between a sidewall of said aperture and said shank, and wherein said head and said knurl are embedded into said panel such that said head is flush with a front surface of said panel; and a first bulge of said shank having an outer surface forceably abutting a backside of said panel in the area around said aperture.

6. The assembly of parts of claim 5 further including a second bulge of said shank having a front surface which forceably abuts a back surface of said first bulge.

7. A threaded blind insert, comprising:

a shank having an axial bore therethrough with a head at one end and a threaded region of the bore at an opposite end, said shank having a wall lying between an outer surface thereof and said bore;

a deformable portion located axially along said shank being an area of reduced diameter; and an area of greater hardness of the material of said shank, said area being axially located at approximately the middle of said area of reduced diameter wherein said area of greater hardness is an area of reduced deformability compared to other regions of said shank.

8. The threaded blind insert of claim 7 wherein said area of greater hardness is formed by heat treatment of said insert.

9. The threaded blind insert of claim 8 wherein said area of greater hardness is a band of hardened material created by heating.

10. The threaded blind insert of claim 9 wherein said area of greater hardness is formed by annealing an area of said shank that lies immediately beyond either side of said area of greater hardness.

11. The threaded blind insert of claim 10 wherein said area of greater hardness is a band of material of said insert bounded on opposite sides by material of the insert which is softened by annealing.

12. The method of fastening a blind threaded insert to a panel comprising the steps of:

providing a panel having a circular aperture therein;

placing an insert into said aperture, said insert comprising:

a shank having an axial bore therethrough with the head at one end and a threaded region of the bore at an opposite end; and a flange located directly adjacent an underside of said head, said flange having an outer diameter greater than the diameter of said shank directly adjacent said flange but less than the diameter of said head, such that a substantial annular gap lies between said shank and a sidewall of said aperture, said head further including a knurl around its periphery;

applying a first compressive force to opposite ends of said insert thereby deforming a first region of the shank of said insert creating a first bulb which abuts a backside of the panel;

applying a greater force which creates a second bulge by deforming a second region of the shank of the insert whereby a front surface of the second bulge abuts a rear surface of the first bulge; and applying a final and greatest compressive force to opposite ends of the insert whereby said head embeds into said panel by a reaction force supplied by said first and second bulbs against the backside of the panel such that said head is embedded to a depth flush with the front surface of said panel.

13. The method of claim 12 wherein said means for applying said increased force, said greater force, and said maximum force is a tool having a pull-stud which is threadably engaged with said threaded region of the bore of said shank.

* * * * *